United States Patent [19]

Van Zeggeren

[11] Patent Number: 5,184,703
[45] Date of Patent: Feb. 9, 1993

[54] SHOCK ABSORBER WITH PISTON VALVE FOR ADJUSTABLE DAMPING

[76] Inventors: Wilhelm A. Van Zeggeren, Uan Goghlaan 18, 2665 XC, both of Bleiswijk, Netherlands

[21] Appl. No.: 474,846
[22] PCT Filed: Apr. 3, 1989
[86] PCT No.: PCT/NL89/00017
§ 371 Date: Sep. 25, 1990
§ 102(e) Date: Sep. 25, 1990
[87] PCT Pub. No.: WO89/09892
PCT Pub. Date: Oct. 19, 1989

[30] Foreign Application Priority Data

Apr. 12, 1988 [NL] Netherlands ............ 8800945

[51] Int. Cl.$^5$ .............................. F16F 9/34
[52] U.S. Cl. .................. 188/319; 188/322.15
[58] Field of Search .................. 188/277–279, 188/283, 297, 299, 313, 316, 317, 319, 322.15, 322.22; 251/11; 337/140

[56] References Cited

U.S. PATENT DOCUMENTS

| 3,038,561 | 6/1962 | Rumsey et al. | 188/278 |
| 3,725,835 | 4/1973 | Hopkins et al. | 337/140 |
| 3,913,170 | 10/1975 | Nakane et al. | 188/277 X |
| 4,484,725 | 11/1984 | Yoshiga | 251/11 |
| 4,645,489 | 2/1987 | Krumme et al. | 251/11 X |
| 4,674,398 | 6/1987 | Taylor | 251/11 X |
| 4,736,587 | 4/1988 | Suzuki | 251/11 X |
| 4,799,577 | 1/1989 | de Carbon | 188/277 |

FOREIGN PATENT DOCUMENTS

| 173433 | 5/1986 | European Pat. Off. |
| 221602 | 5/1987 | European Pat. Off. |
| 236204 | 9/1987 | European Pat. Off. |
| 373996 | 6/1990 | European Pat. Off. | 188/278 |
| 2168455 | 6/1986 | United Kingdom |

Primary Examiner—Robert J. Oberleitner
Assistant Examiner—Alfred Muratori
Attorney, Agent, or Firm—Robert P. Seitter; J. Gordon Lewis

[57] ABSTRACT

A shock absorber includes a cylinder (1) with damping fluid, a piston rod (2) which is displaceable in the cylinder (1) and a piston (3) attached thereto which bounds a central aperture (8) extending in the axial direction of the cylinder (1) and closed at the end opposite from the piston rod (2). The piston (2) has at least two duct systems with different damping characteristics, so that damping fluid can flow to spaces (17, 18) in the cylinder (1) on either side of the piston (3). The duct systems connect by means of an aperture or group of apertures (9, 10) to the central aperture (8) bounded by the piston (3). For the purpose of controlling the fluid flow through the central aperture (8) by opening or closing off one or more of the apertures or groups of apertures (9, 10) as desired, the shock absorber is provided with at least one sleeve-type body (6) which is axially displaceable within the central aperture (8) through the activation of at least one element (4, 5) of memory metal and, in an opposite direction by at least one further element (14), such as a compression spring. For locking the body (6) in a particular position, the central aperture (8) being provided with axially displaced slots (35, 36) containing a loop-type element (37, 38) of memory metal selectively engaging in at least one corresponding slot (39) in the body (6).

17 Claims, 2 Drawing Sheets

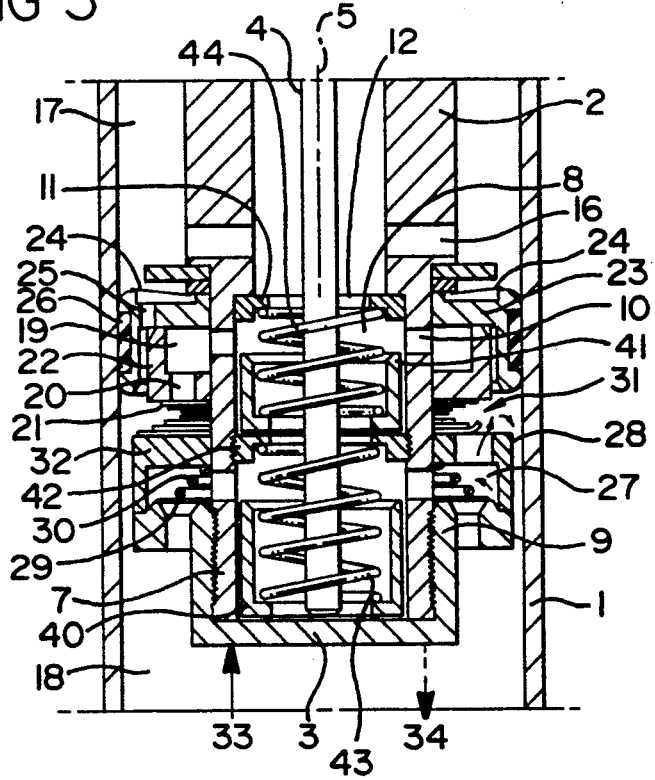
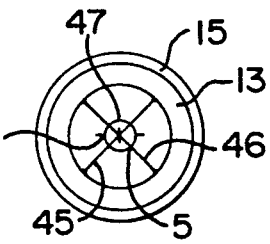
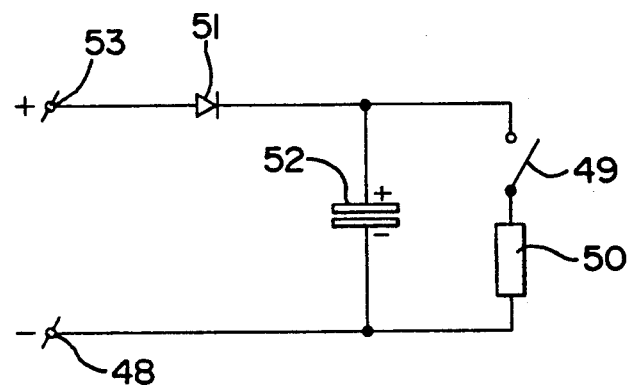

SHOCK ABSORBER WITH PISTON VALVE FOR ADJUSTABLE DAMPING

INTRODUCTION

The present invention relates to a shock absorber, comprising a cylinder with damping fluid, a piston rod, which is displaceable in the cylinder and having a piston attached thereto which bounds a central aperture running in the axial direction of the cylinder, said central aperture being shut off at the end away from the piston rod, the piston being provided with at least two duct systems having different damping characteristics, said duct systems connect by means of an aperture or group of apertures to the central aperture, such that damping fluid can flow through the central aperture, to spaces in the cylinder on either side of the piston, and a sleeve, which is axially displaceable in the central aperture for controlling the fluid flow through the central aperture by opening or closing off one or more of the apertures or groups of apertures.

BACKGROUND OF THE INVENTION

A shock absorber of this type is known from European patent application 0,221,602.

The purpose of controlling the fluid flow in a shock absorber is to adapt the damping properties thereof as far as possible in an optimum manner to the momentary traveling conditions of a vehicle equipped with one or more of such shock absorbers. In motor vehicles it is for example important to keep the wheels in constant contact with the road as far as possible during moving off, acceleration, sudden sharp braking or when the motor vehicle leans to the side. It goes without saying that the type of road surface also plays an important role in the selection of the damping characteristics of the shock absorber. In general, if the road surface is good and fairly even, relatively little damping will be selected, while in the case of a poor, uneven road surface the shock absorbers have to be set with relatively great damping effect.

In the known shock absorber the sleeve is displaceable in axial direction of the central aperture by electrically controlled means, such as an electromagnet having a coil in which a core is movably arranged. The core is axially connected to the sleeve in its center. The sleeve has axial through flow channels, having cross-section dimensions such that the flow of damping fluid through the central aperture is not or in a neglectable manner impeded.

The damping characteristics of this know shock absorber are determined by the position of the sleeve in the central aperture, in other words, through which duct system(s) fluid can flow to the spaces on either side of the piston in the cylinder. With this arrangement the damping characteristics of the shock absorber can be controlled proportionally, independently of the speed of travel or direction of movement of the piston Depending on the number of duct systems and their respective flow characteristics, the final damping characteristic of the shock absorber can be set proportionally over a wide range of speeds of travel of the piston.

The choice of the cross-section dimensions of the through flow channels in the sleeve or in general a sleeve-type element for the control of the fluid flow in the central aperture, is also based on the effort to make the response speed of the control as far as possible independent of the fluid pressure in the aperture.

As is well known, the response time of an electromagnet depends on the speed with which a magnetic force of sufficient strength can be built up to move the core. Generally, the response time of an electromagnet decreases if the magnet has to provide for an increased magnetic strength. However, for an effective control of the damping characteristics of shock absorbers there is a need for a response time of the order of few tenths of milliseconds or less. Such a response time cannot be achieved by a shock absorber having an electromagnet as the means for displacement of the sleeve.

From the European patent application 0,236,204 a shock absorber is known, having a piston with a first duct system which is shut off by means of spring-loaded valves which open or close under the influence of the speed of travel and the direction of movement of the piston, and a second duct system which is formed by a central aperture in the piston, and in which the fluid flow can be allowed through or held back by means of a displaceable body. Said body can be displaced through the activation of a wire memory metal.

Although a wire memory metal has the potential for achieving the intended response time, in the embodiment of the shock absorber disclosed by EP-A-0,236,204 the displaceable body is a pin-type element for opening or closing off the central aperture. With this shock absorber it is only possible to achieve a control system similar to an ON/OFF control, with which the damping characteristics of the shock absorber cannot by any means be adapted in the optimum manner to the mentioned traveling conditions. Because the fluid flow through the first duct system is determined only by the speed of travel and the direction of movement of the piston, allowing through or shutting of the fluid flow in the central aperture by means of the pin-type element will result in hardly any appreciable change in the damping characteristics upwards of a certain speed of travel of the piston.

Through activation of the element of memory metal the pin-type element is moved parallel to the fluid flow in the central aperture, for shutting it off. During the movement of the piston in the cylinder the fluid pressure causes a force opposed to the force exerted on the pin-type element by the wire of memory metal. Since a relatively narrow duct has to be opened or closed in the central aperture, the fluid pressure in this duct will rise relatively high, and the force exerted thereby on the pin-type element will consequently be relatively high, which has an adverse effect on the response time of the shock absorber control.

BRIEF DESCRIPTION OF THE INVENTION

The object of the invention is therefore to produce a shock absorber in which the damping characteristics can be regulated proportionally, with improved response times practically independent of the fluid flow in the shock absorber. This is achieved according to the invention in that the sleeve being displaceable in one direction through the activation of at least one wire-type element of memory metal and in the other, opposite, direction by at least one further element acting upon the sleeve, at least two bar-type fixing elements being disposed diametrically, crosswise in the sleeve, said at least one wire-type element of memory metal extends in lengthwise direction of the piston rod into the central aperture of the piston and engages said at least two fixing elements for the displacement of the sleeve.

The cross section dimension of the central aperture of the piston is selected in such a size that a relatively low fluid pressure prevails therein. The at least one wire-type element of memory metal extends into the central aperture of the piston to engage the sleeve directly for the displacement thereof. In order to keep the influence of the fluid pressure on the sleeve to a minimum, according to the invention, at least two bar-type fixing elements are disposed diametrically, crosswise in the sleeve, and the at least one wire-type element of memory metal engaging said at least two fixing elements. With these at least two bar-type fixing elements the cross-section dimensions of the aperture of the sleeve and the central aperture of the piston are essentially not influenced, neither are the damping characteristics of the shock absorber. The speed of travel of the sleeve is consequently determined virtually exclusively by the force exerted by the at least one element of memory metal and by the further element acting upon the sleeve.

An easy coupling of said at least one wire-type element of memory metal and the sleeve, for the displacement thereof, is in a further embodiment of the invention obtained, in that said at least one wire-type element of memory metal is provided in the form of a loop and is wound round said at least two fixing elements, such that the individual wires of a loop extend in opposite sectors in the sleeve divided by said at least two fixing elements.

In order to provide for special separation of the wires of said at least one wire-type element of memory metal, in a still further embodiment of the invention a cap-shaped element is provided, which engages said at least two fixing elements, and wherein said at least one wire-type element of memory metal being wound in the form of a loop around said cap-shaped element.

If said at least two fixing elements and said cap-shaped element are either made of electrically insulating material or are provided with an electrically insulating covering, or if said at least one wire-type element of memory metal is electrically insulating relative to the sleeve, the electrical current required for heating said at least one element of memory metal flows only through the element itself, and the electrical power required for this can be supplied at the two ends of the wire. These wire ends can be fastened at the end of the piston rod to be connected to the chassis of a vehicle. This has the advantage that when the shock absorber is being fitted provision need not be made for an electrical earth connection and the use of flexible electrical cables for conducting the electric current for heating the at least one element of memory metal. Such connections and cables are in practice fairly prone to faults, which in the long run can result in a deterioration in the functioning of the shock absorber control.

With a particular view to creating stepwise control of the fluid flow in the piston, of which the apertures or groups of apertures of the individual duct systems connect to the central aperture in such a way that they are displaced in the axial direction, in a yet further embodiment of the shock absorber according to the invention, several wire-type elements of memory metal acting on the sleeve are provided with differing memory action, such that the sleeve can be displaced in stages through respective activation of the elements of memory metal.

In order to achieve an even more flexible control of the momentary damping characteristics of the shock absorber, in another embodiment of the invention the sleeve is made up of two Or more partial sleeves, which can be displaced independently of each other, and each of which is acted upon by at least one wire-type element of memory metal and a further element. By producing several duct systems with differing damping characteristics and a partial sleeve which is operable separately for each duct system, it is possible to adapt the damping characteristics of the shock absorber according to the invention proportionally in a simple manner so that they are virtually optimum for the traveling conditions of a vehicle in practice.

In order to be able to displace the sleeve or the partial sleeves in stages using only one element of memory metal, or in order to be able to hold the sleeve or the partial sleeves in a particular position for a longer period of time, in yet another embodiment of the shock absorber according to the invention locking means are provided in the central aperture for locking the sleeve or the partial sleeves in one or more positions. A manual and automatic locking facility is obtained by also making the locking means according to the invention of memory metal.

In an embodiment of the shock absorber according to the invention at least one locking element is provided, designed in the form of a loop which is provided in its entirely in a slot disposed in radial direction in the wall of the central aperture, while at least one further slot is disposed at the side of the sleeve or the partial sleeves facing said wall, said at least one locking element having a memory action such that on heating thereof above its transition temperature the loop tries to assume a smaller diameter, and said at least one further slot in the sleeve or partial sleeves being of such depth that it can accommodate only part of the loop.

If the at least one further slot of the sleeve or the partial sleeves according to an embodiment of the invention is made so that it is essentially tapering from the opening, after the lock is removed the loop is pushed back into its appropriate slot in the wall bounding the central aperture.

Since, as already discussed above, the force required for displacing the sleeve or the partial sleeves has to be virtually independent of the fluid pressure in the shock absorber, it is advantageous to made use of a sleeve or partial sleeves which are beveled inwards at the end facing the piston rod.

A still further embodiment of the shock absorber according to the invention is provided with at least one wire-type element of memory metal having such memory action that on heating above its temperature it tries to assume a predetermined short length, said at least one further element being a permanent spring-loaded compression spring, and wherein provision is made in the sleeve or the partial sleeves for a stop against which one end of the at least one compression spring rests, while the other end rests against at least one further stop disposed in the central aperture, above the apertures or groups of apertures of one or more of the duct systems, seen in the direction from the closed end of the central aperture.

Since only the relatively low power for displacing the sleeve or the partial sleeves needs to be produced by said at least one wire-type element of memory metal, and since the distance along which the sleeve or the partial sleeves have to be displaced in the central aperture, in particular in the embodiment with several partial sleeves, is relative short compared with the length of the wire-type elements of memory metal, the wire mass to be heated in the end can be limited in such a way that the response time of the shock absorber can be of the order of 30 milliseconds or less. Such a rapid response time, accompanied by a proportional control of the damping characteristics of the shock absorber, cannot be achieved by means of the electromagnetically controlled shock absorbers known in practice, for example as described in EP-A-0,221,602 or GB-A-2,168,455.

Although the at least one further element acting on the sleeve or the partial sleeves for displacement thereof in the direction opposite to the direction of movement produced by the at least one element of memory metal can also be made of memory metal, this at least one further element is preferably a permanently resilient compression spring, in order to ensure that a desired rapid response time is obtained. Since, as already mentioned above, the force for moving the sleeve or the partial sleeves is virtually independent of the fluid pressure, the spring pressure exerted by this compression spring can be kept relatively small. Easy fitting is achieved if said at least one further stop is, according to another embodiment of the invention, in the form of an open dish mounted by means of a screw thread connecting in the central aperture.

Depending on the mass of the elements of memory metal, a certain quantity of heat is necessary for making them rise in temperature in a certain period of time. According to an embodiment of the invention, the heating of an element of memory metal is achieved with the electric charges of at least one rechargeable capacitor. The number of capacitors required depends, inter alia, on the required response time, the available charge current for charging the capacitors, and the number of elements of memory metal which have to be activated.

The invention also relates to a control unit for controlling the fluid flow in a shock absorber of the type comprising a cylinder with damping fluid, having a piston rod which is displaceable in the cylinder and having a piston attached thereto which bounds a central aperture running in the axial direction of the cylinder, said central aperture being shut off at the end away from the piston rod, the piston being provided with at least two duct system which connect by means of an aperture or group of apertures to the central aperture, such that damping fluid can flow through the central aperture to spaces in the cylinder on either side of the piston wherein the control unit comprising a tubular element for accommodation in the piston rod, having at least one displaceable sleeve in which at least two bar-type fixing elements being diametrically, crosswise disposed, at least one wire-type element of memory metal engaging said at least two fixing elements, and at least one further element acting on the at least one sleeve, for displacing the same in axial direction of the central aperture for controlling the fluid flow passing said central aperture.

The shock absorber according to the invention is described in greater detail below with reference to the embodiment shown in the figures of the drawing, with further advantages and embodiments thereof also being indicated.

BRIEF DESCRIPTION OF THE DRAWINGS

FIG. 3, shows schematically a partial cross section through a shock absorber, containing according to the invention an assembly of two independently movable partial sleeves for influencing the fluid flow;

FIG. 4, shows a view of the sleeve according to FIG. 1, viewed from the piston rod, without the compression spring contained therein; and FIG. 5, shows an electrical circuit diagram for activation of the elements of memory metal disposed in the shock absorber.

Figure 1:
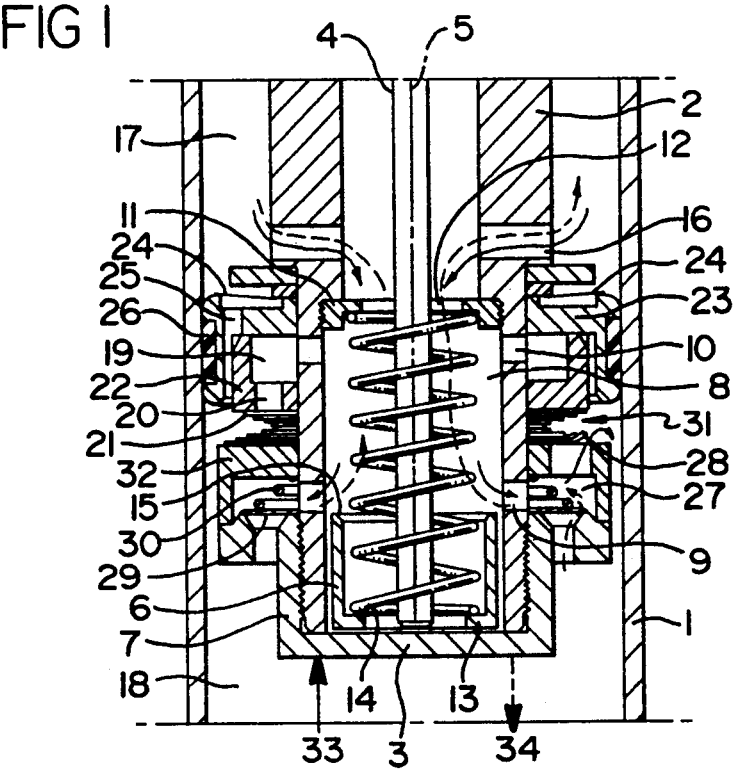
FIG. 1, shows schematically a partial cross section through a shock absorber having therein according to the invention a sleeve for influencing the fluid flow.

DETAILED DESCRIPTION OF THE PREFERRED AND ALTERNATIVE EMBODIMENTS OF THE INVENTION

Only the part of the shock absorber which is important for the invention is illustrated in the drawing. The shock absorber comprises a cylinder 1 with a piston rod 2 and a piston 3 connected thereto. Chassis or wheel suspension parts of a vehicle can be fastened to the ends of the cylinder 1 and the piston rod 2. A damping medium which is know per se is provided in the piston/cylinder unit. Two loop-type wires 4, 5 of memory metal extend in the piston rod and with their loop-type end engage to a sleeve 6 which is movably positioned in a central aperture 8 formed by the cylindrical end 7 of the piston rod 2. The central aperture 8 is shut off by the piston 3 screwed from the end 7 on the piston rod. The central aperture 8 has two groups of apertures 9 and 10 which are displaced in the axial direction, and which correspond respectively to a first and second duct system with different damping characteristics. The dimensions of the sleeve 6 are such that the fluid flow in the central aperture 8 can flow unimpeded through it.

The central aperture also contains a dish-shaped stop 11 with an aperture 12 for limiting the movement of the sleeve 6. The aperture 12 is of such dimensions that the fluid flow through the central aperture 8 is not essentially affected. The stop 11 can be fitted, as shown, by means of screw-thread connection in the central aperture 8. The sleeve 6 is also dish-shaped at its end facing away from the piston rod, in such a way that a stop 13 projecting into the interior of the sleeve is formed. A permanently resilient compression spring 14 is provided between the stop 13 and the stop 11 for moving the sleeve 6 in a direction opposite to the direction of movement produced by the wires 4, 5 of memory metal.

The term memory metal is generally understood to indicate metal alloy or a group of metal alloys which have the capacity, after the metal has acquired a particular shape at a suitable temperature, to return by themselves to that shape always on heating above a particular transition temperature. Below this transition temperature the memory metal can apparently be deformed plastically. The transition temperature and a hysteresis range around this transition temperature are determined by the composition of the alloy. As a result of the good controllability and unlimited repeatability of the shape recovery behavior and through the relatively tightly limited transition temperature, these alloys can be used as converters of thermal energy into mechanical energy. The alloys which attract most interest in practice are CuZnAl, CuAlNi and TiNi, the last-mentioned metal also going under the name of Nitinol.

The wires 4, 5 of memory metal for displacing the sleeve 6 according to the invention are programmed in such a way that with the wire 4, for example, the sleeve 6 can be moved beyond the apertures 9, and through activation of the wire 5 the sleeve 6 can be moved against the stop 11. The dimensions of the sleeve 6 shown in FIG. 1 are such that either the apertures 9 or the apertures 10, in other words the first or the second duct system, can be shut off. It goes without saying that by reducing the axial distance between the apertures 9 and 10 the latter can also be shut off at the same time. The same effect can also be achieved by a suitable choice of the dimensions of the sleeve 6. In order to make the force to be exerted by the wires 4, 5 of memory metal as independent as possible from the fluid pressure in the central aperture 8, the sleeve 6 is provided with an inward-beveled edge 15 at its end facing the stop 11.

Since, as already indicated in the preamble, the force required for moving the sleeve 6 is virtually independent of the fluid pressure in the central aperture 8 and is determined essentially by the compression spring 14 acting upon the sleeve 6, by making a suitable choice of the spring force thereof it is sufficient to have thin wires of memory metal, with a diameter of the order 0.1–0.4 mm. Wires of such dimensions can be heated so rapidly above their transition temperature that response times of the order of 30 msec or less can be achieved. It goes without saying that the transition temperature of the wires of memory metal must lie above the working temperature of the shock absorber. A transition temperature of the order 80° C. is found to be very satisfactory in practice.

In the shock absorber shown in FIG. 1 the damping fluid can flow via apertures 16 disposed in the piston rod and the first and second duct system corresponding to the apertures 9, 10 to spaces 17, 18 lying on either side of the piston 3 in the cylinder 1. The apertures 10 are connected via first chamber 19 to an aperture 20, against which a spring-loaded one-way valve 21 rests. This aperture 20 is disposed in a body 22 on which rests a sealing body 23 which is provided with a one-way valve 24 for opening or closing a duct 25. The body 23 with a sealing element 26 forms the actual seal between the cylinder 1 and the piston rod 2. The apertures 9 are connected to a second chamber 27 which is provided with one-way valves 28, 29. The one way valve 29 here is under the tension of conical helical spring 30, while the one-way valve 28 is loaded in the neutral position by a spring packet 31. This spring packet 31 is also used to push the one-way valve 21 back to its end position. A body 32 bounding the second chamber 27 is at such a distance from the cylinder 1 that damping medium can flow freely between them.

Starting from such a position of the sleeve 6 that the apertures 10 belonging to the second duct system are shut off, on the outward movement of the shock absorber, which is indicated by an arrow 33, the damping medium is moved from the space 17 to the space 18. The damping medium here flows through the apertures 16 via the sleeve 6 virtually unimpeded into the central aperture 8. The one-way valve 24 prevents the passage of the damping medium, with the result that it can flow only via the apertures 9 of the first duct system to the space 18. Since the one-way valve 29 is closed during this movement of the piston rod, the damping fluid can only flow out via the one-way valve 28 against the spring pressure of the spring packet 31, as indicated by the solid arrow.

On the inward stroke, which is indicated by a dashed arrow 34, and during which the damping medium has to be displaced from the space 18 to the space 17, the damping medium flows via the one-way valve 29, the apertures 9, the central aperture 8 and the apertures 16 to the space 17, as indicated by dashed arrows. The one way valve 24 requires such great force to be opened that it remains shut in the position shown in FIG. 1.

In the position in which the sleeve does not shut off either of the apertures 9, 10, on the outward movement the damping medium flows out of the space 17 to the space 18, and this medium does not only flow in the manner described above via the apertures 16, 8, 9 but, because the apertures 10 are now open, can also flow through the chamber 19 and the one-way valve 21 to the space 18. This means that the damping is lower than if the apertures 10 were closed.

In the position of the sleeve 6 in which the apertures 9 are shut off, on the outward stroke the damping medium flows only through the one-way valve 21 from the space 17 to the space 18. On the inward stroke of the shock absorber the flow path through the one-way valve 29 is no longer possible, because the apertures 9 are shut. The medium can flow through the duct 25 to the space 17 only if the one-way valve 24 is opened. The damping here can be chosen at a very high level in both directions of flow.

Figure 2:
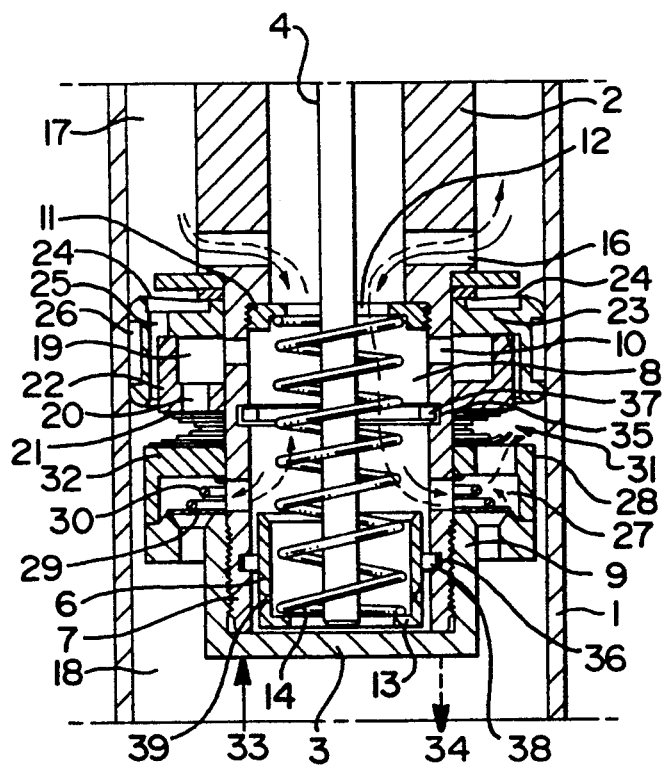
FIG. 2, shows schematically a partial cross section through a shock absorber according to the invention, containing locking means for locking the sleeve in a particular position.

The position of the sleeve 6 can be adjusted continuously to the momentary damping requirements through activation of the wires 4, 5 of memory metal. However, it may also be desired in practice to lock the sleeve 6 in a particular position, so that a particular desired shock-absorbing action is obtained, for example the "sport position", in which the shock absorber has to have a relatively high damping action. FIG. 2 shows a possible embodiment for locking the sleeve 6 in a particular position, corresponding to the embodiment of the shock absorber shown in FIG. 1, the parts corresponding to FIG. 1 being indicated by the same reference numbers.

Disposed in the wall of the end 7 of cylinder rod 2 bounding the central aperture 8 are two axially displaced slots 35, 36 running all the way around, each of which contains a loop-type element 37, 38 of memory metal. The sleeve 6 has on its surface facing the wall bounding the central aperture 8 a corresponding circular slot 39 of such depth that it can accommodate only part of the loops 37, 38 of memory metal. In the embodiment shown the slot 39 is in the form of an isosceles trapezoid, the broad base of which faces the wall of the end 7 bounding the central aperture 8. The memory action of the respective loops is such here that on heating above their transition temperature they try to take on a smaller diameter.

When the sleeve 6 is displaced through activation of the wires 4 of memory metal, the sleeve can be locked in a certain position when the slot 39 is opposite one of the slots 35, 36. Activation of one of the loops 37, 38 of memory metal will cause it to go partly into the slot 39 and partly into the slot 35 or 36, with the result that the sleeve 6 can be locked in the position in which the apertures 10 or the apertures 9 are shut. As a result of the trapezoidal shape of the slot 39, on discontinuation of the excitation of one of the loops of memory metal the latter will be pushed back into its appropriate slot through the displacement of the sleeve 6 as a result of the force exerted thereon by the compression spring 14 or the wire 4 or memory metal with the result that the sleeve 6 can be moved unimpeded again in the central aperture 8. The play of the sleeve 6 in the central aperture may be about 0.1 mm, without the fluid leak along the sleeve having any appreciable effect on the damping characteristics of the shock absorber.

The shape of the loops 37, 38 of memory metal and the slot 39 can be adapted here to each other in such a way that the minimum of force is needed to return a non activated loop of memory metal to its respective slot. The loops 37, 38 of memory metal are preferably heated by means of an electric current. The connecting wires needed for this purpose can be conveyed outside (not shown) by means of the piston rod 2.

Unlike the embodiment shown in FIG. 1, through appropriately controlling the loops 37, 38 of memory metal, it is possible for the sleeve 6 to be displaced in stages with only a single wire 4 of memory metal which is always tensioned during this process. Of course, the sleeve 6 can be provided with several axially displaced slots, in order to permit locking of the sleeve in positions other than complete closure of the apertures 9 or 10.

FIG. 3 shows a preferred embodiment of the shock absorber according to the invention, in which in the central aperture 8 two partial sleeves 40 and 41 with the wires 4 and 5 respectively of memory metal can be displaced independently of each other. For this purpose, the central aperture is provided with a further dish type stop 42, corresponding to the stop 11, for limiting the movement of the first partial sleeve 40, on which a compression spring 43 also acts. The second partial sleeve 41 is subject to the spring force of a compression spring 44. The shape of the partial sleeves 40, 41 corresponds to that of the sleeve 6, and the structure of the shock absorber is otherwise as shown in FIG. 1.

Dividing the sleeve 6 into two partial sleeves 40, 41 by means of which the apertures 9, 10 of the first and second duct system can be shut or opened, makes it possible to adjust the shock absorption to virtually all traveling conditions. Since each sleeve has to be moved over a relatively short distance, typically of the order of 4 mm, a desired very short response time of about 20 msec can be achieved. It will be clear that the two partial sleeves 40 and 41 can also be provided with locking means (not shown) for locking thereof in one or more positions, in the same way as shown in FIG. 2.

FIG. 4 shows a view of the sleeve 6 or the partial sleeves 40 and 41, looking towards the beveled edge thereof, without compression spring. In order to influence the fluid flow in the central aperture as little as possible, at least two bar-type fixing elements 45, 46 are fixed in crosswise diametrical fashion in the aperture thereof bounded by the dish-type stop 13, for displacing of the sleeve or the partial sleeves by means of the wires 4, 5 of memory metal. The wires 4, 5 of memory metal are here wound by their loop type end around these fixing elements 45, 46 in such a way that their wire ends always lie in another, opposite sector of the aperture of the sleeve or the partial sleeves which is divided by the fixing elements 45, 46. In order to produce further spatial division of the wires 4, 5 of memory metal, a cap-shaped element 47 with convex side in the direction facing away from the piston rod can be disposed in the point of intersection of the fixing elements 45, 46.

In order to insulate the wires of memory metal electrically from the piston rod and/or the piston, the sleeve or the partial sleeves or the fixing elements 45, 46, for example, can be made of wear-resistant aluminum oxide. In order to prevent undesired electrical contact of the wires of memory metal with the piston rod, insulation means can be disposed at suitable intervals in the piston rod as spacers for the wires of memory metal. At the side facing away from the piston, the piston rod can be sealed off in a known manner, in which the wires of memory metal and, if necessary, the connecting wires for activation of the locking loops can be passed through a glass insulator.

It will be clear that the shock absorber according to the invention is not restricted to the use of two partial sleeves as shown in FIG. 3, but that the central aperture can contain several partial sleeves which can work in concert with one or more apertures or groups of apertures of the duct systems of the piston. In order to achieve the desired spatial and electrical separation of the individual wires of memory metal, according to FIG. 4 the fixing elements can be disposed in the various partial sleeves in such a way that one obtains sectors which are displaced relative to each other in the axial direction and in which the individual wires of memory metal extend.

The control parameters for setting the damping characteristics of the shock absorber can be processed by means of accelerometers, gradient detectors etc.—if necessary via one or more microprocessors—to a command for activation of one or more wires of memory metal or loops for locking the sleeve or the partial sleeves, for example, so that in as many traveling conditions as possible constant road contact of the wheels of a car or other motor vehicle or in the case of rail vehicles constant contact of the wheels with the rails is achieved. The signals coming from the microprocessor(s) can then be translated into control pulses for switches for activation of the respective elements of memory metal.

As already mentioned in the introduction, capacitators can be used advantageously for rapid heating of the elements of memory metal. FIG. 5 gives a circuit diagram for such capacitor control. In its simplest form, the circuit comprises a diode 51 with a capacitor 52 connected in series thereto. The cathode of the diode 51 is connected to the positive electrode (+) of the capacitor 52 and the anode of the diode 51 is connected to a positive supply connection point 53, and the earth electrode (−) of the capacitor is connected to a negative supply connection point 48. The capacitor 52 has a series circuit comprising a switch 49 and an element 50 of memory metal connected in parallel.

When the switch 49 is in its non-conducting state, the capacitor 52 is charged via the diode 51. When the switch 49 is subsequently switched to the conducing state, the energy stored in the capacitor 52 will be conveyed to the element 50 of memory metal, which is thereby heated. When the switch 49 is subsequently returned to its non-conducting state, the capacitor 52 will be recharged, and the cycle repeated.

If, on the other hand, the switch 49 remains in its conducing state, a current will flow continuously via the diode 51 through the element 50 of memory metal, so that the latter remains in its heated state.

If several capacitors 52 are connected in parallel, the energy supplied to the element of memory metal 50 when the switch 49 becomes conducting is correspondingly greater. Instead of the mechanical switch 49 shown, it is, of course, also possible to use switching semi conductor components such as transistors, thyristors etc.

The embodiments of the shock absorber control discussed above can also advantageously be designed as a separate shock absorber control unit for installation in the piston rod 2, by producing the assembly of the sleeve or the partial sleeves, the wires of memory metal, the compression springs etc. with a tubular element which is fitted in the piston rod. In the event of, for example, breakdowns and the like, rapid repair is possible with such a shock absorber control unit, without the shock absorber having to be disconnected from the chassis or the wheels of a vehicle, or the shock absorber having to be replaced completely.

It goes without saying that the invention is not limited to the embodiments thereof which have been described and illustrated, but that for an expert many modifications and additions are possible, for example the use of elongated, helical-type wires of memory metal etc., without going beyond the scope of the invention.

I claim:

1. A shock absorber, comprising a cylinder containing damping fluid, a piston rod displaceable in the cylinder and a piston attached to said piston rod closing an axially extending central aperture within the cylinder, said central aperture being closed at an end opposed from the piston rod, the piston including at least two duct systems having different damping characteristics, said duct systems interconnected by at least one aperture to the central aperture, such that damping fluid can flow through the central aperture to spaces in the cylinder on axially opposed sides of the piston, said shock absorber further comprising a sleeve which is axially displaceable within the central aperture for controlling the fluid flow therethrough by opening and closing said at least one aperture, wherein the sleeve is displaceable in one direction in response to activation of at least one wire-type element of memory metal and in another, opposite, direction by at least one further element acting upon the sleeve, said shock absorber further comprising at least two bar-type fixing elements disposed diametrically, crosswise in the sleeve, said at least one wire-type element of memory metal extending in lengthwise direction of the piston rod into the central aperture of the piston and operatively engageing said at least two fixing elements at an attachment point formed thereby for the displacement of the sleeve.

2. A shock absorber according to claim 1, wherein said at least one wire-type element of memory metal is configured in the form of a loop and is wound around said at least two fixing elements whereby individual wires of said loop extend axially within the sleeve spaced apart by said at least two fixing elements.

3. A shock absorber according to claim 2, wherein a cap-shaped element engages said at least two fixing elements to effect spatial separation of the wires of said at least one wire-type element of memory metal.

4. A shock absorber according to claim 1, wherein several wire-type elements of memory metal acting on the sleeve effect differing memory action, whereby the sleeve is displaceable in stages through respective activation of the elements of memory metal.

5. A shock absorber according to claim 1, wherein the sleeve comprises at least two partial sleeves, which are displaceable independently of each other, each being acted upon by at least one wire-type element of memory metal and a further element.

6. A shock absorber according to claim 1, further comprising locking means disposed in the central aperture operative to lock the sleeve in at least one predetermined axial position.

7. A shock absorber according to claim 6, wherein said locking means comprises at least one locking element of memory metal.

8. A shock absorber according to claim 7, wherein said at least one locking element is configured in the form of a loop entirely disposed in a radial slot in a wall forming the central aperture, while at least one further slot is disposed at the side of the sleeve facing said wall, said at least one locking element having a memory action such that on heating thereof above a characteristic transition temperature the loop assumes a smaller diameter, and said at least one further slot in the sleeve being of such depth that it can accommodate only part of the loop.

9. A shock absorber according to claim 8, wherein said at least one further slot of the sleeve is essentially tapered inwardly in the side of the sleeve.

10. A shock absorber according to claim 1, wherein the sleeve is beveled inwards at an end facing the piston rod.

11. A shock absorber according to claim 1, wherein said at least one wire-type element of memory metal has such memory action that on heating above a characteristic transition temperature it assumes a predetermined short length, said at least one further element comprises a permanent spring-loaded compression spring, and wherein the sleeve comprises a stop against which one end of the at least one compression spring rests, while the other end rests against at least one further stop disposed in the central aperture, axially above the aperture of the duct systems, as viewed from the closed end of the central aperture.

12. A shock absorber according to claim 11, wherein said at least one further stop comprises an open dish affixed by means of a screw thread connection in the central aperture.

13. A shock absorber according to claim 1, wherein at least one rechargeable capacitor is in circuit with said at least one element of memory metal for electric activation thereof.

14. A shock absorber according to claim 1, wherein said sleeve is formed by a substantially cylindrical wall member defining an open central cavity and said fixing elements comprise elongate, wire like members laterally traversing said central cavity.

15. A shock absorber according to claim 14, wherein each end of each said fixing element is attached to said cylindrical wall.

16. A shock absorber according to claim 14, wherein said fixing elements intersect near an axis of said wall member to establish said attachment point.

17. A control unit for controlling damping fluid flow in a shock absorber of the type comprising a cylinder with damping fluid, having a piston rod which is displaceable in the cylinder and having a piston attached thereto which bounds a central aperture running in the axial direction of the cylinder, said central aperture being closed at an end opposed from the piston rod, the piston including at least two duct systems interconnected by at least one aperture to the central aperture, such that damping fluid can flow through the central aperture to spaces in the cylinder on either side of the piston, wherein the control unit comprises a tubular element disposed within the piston rod, including at least one displaceable sleeve in which at least two bar-type fixing elements are diametrically, crosswise disposed, at least one wire-type element of memory metal operatively engaging said at least two fixing elements and at least one further element acting on the at least one sleeve for axially displacing the at least one sleeve within the central aperture for controlling the fluid flow passing through said central aperture said control unit further comprising a source of electrical energy in circuit with said element of memory metal operable for selective electrical energization thereof.

* * * * *